United States Patent
Sugiyama et al.

(10) Patent No.: US 9,703,168 B2
(45) Date of Patent: Jul. 11, 2017

(54) OPTICAL MODULE AND TRANSMITTING APPARATUS

(71) Applicant: Fujitsu Optical Components Limited, Kawasaki-shi, Kanagawa (JP)

(72) Inventors: Masaki Sugiyama, Sagamihara (JP); Yoshinobu Kubota, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 63 days.

(21) Appl. No.: 14/710,087

(22) Filed: May 12, 2015

(65) Prior Publication Data
US 2016/0011488 A1    Jan. 14, 2016

(30) Foreign Application Priority Data
Jul. 11, 2014    (JP) .................. 2014-143417

(51) Int. Cl.
| | |
|---|---|
| *H04B 10/00* | (2013.01) |
| *G02F 1/225* | (2006.01) |
| *G02F 1/01* | (2006.01) |
| *G02F 1/21* | (2006.01) |

(52) U.S. Cl.
CPC ............ *G02F 1/225* (2013.01); *G02F 1/0121* (2013.01); *G02F 2001/212* (2013.01); *G02F 2201/18* (2013.01)

(58) Field of Classification Search
CPC ....... H04B 10/40; H04B 10/50; H04B 10/505
See application file for complete search history.

(56) References Cited

U.S. PATENT DOCUMENTS

| | | | |
|---|---|---|---|
| 8,478,129 B2 * | 7/2013 | Minota | H05K 1/148 398/138 |
| 2005/0168957 A1 | 8/2005 | Kawauchi et al. | |
| 2009/0000809 A1 * | 1/2009 | Yagisawa | G02B 6/43 174/254 |

(Continued)

FOREIGN PATENT DOCUMENTS

| | | |
|---|---|---|
| JP | 2005-217284 | 8/2005 |
| JP | 2010-028800 | 2/2010 |

(Continued)

OTHER PUBLICATIONS

Japanese Office Action dated May 9, 2017 in corresponding Japanese Patent Application No. 2014-143417.

*Primary Examiner* — Dzung Tran (57) ABSTRACT

An optical module includes: a driver; an optical modulator; a connector that is electrically connected to either the driver or the optical modulator and is provided with an input/output terminal; and a flexible substrate that has flexibility, is connected to the connector, and transfers an electrical signal generated by the driver to the optical modulator, wherein in an end part connected to the connector, the flexible substrate has, on a first surface facing the input/output terminal, a signal-purpose wiring pattern used for transferring the electrical signal and a ground-purpose wiring pattern formed along the signal-purpose wiring pattern, and has, on a second surface that is different from the first surface, a ground electrode that partially covers the second surface and has a shorter electrical distance to the signal-purpose wiring pattern than an electrical distance between the signal-purpose wiring pattern and the ground-purpose wiring pattern.

10 Claims, 5 Drawing Sheets

(56) References Cited

U.S. PATENT DOCUMENTS

| | | | | |
|---|---|---|---|---|
| 2010/0124423 A1* | 5/2010 | Kagaya | ............... | H01P 1/20345 398/182 |
| 2013/0027762 A1* | 1/2013 | Sugiyama | ............ | H05K 1/0215 359/245 |
| 2013/0266278 A1 | 10/2013 | Kato et al. | | |
| 2014/0119686 A1 | 5/2014 | Sugiyama | | |
| 2016/0204554 A1* | 7/2016 | Yasuda | ............. | H01R 13/6658 439/620.22 |

FOREIGN PATENT DOCUMENTS

| | | |
|---|---|---|
| JP | 2011-182039 | 9/2011 |
| JP | 2012-137537 | 7/2012 |
| JP | 2013-029791 | 2/2013 |
| JP | 2014-82360 | 5/2014 |
| JP | 2014-86540 | 5/2014 |
| JP | 2014-89310 | 5/2014 |

* cited by examiner

OPTICAL MODULE AND TRANSMITTING APPARATUS

CROSS-REFERENCE TO RELATED APPLICATION

This application is based upon and claims the benefit of priority of the prior Japanese Patent Application No. 2014-143417, filed on Jul. 11, 2014, the entire contents of which are incorporated herein by reference.

FIELD

The embodiments discussed herein are directed to an optical module and a transmitting apparatus.

BACKGROUND

Conventionally, in optical modulators that modulate light generated by a light source, a Mach-Zehnder interferometer may be provided. In those optical modulators, a signal electrode and a ground electrode are provided along parallel optical waveguides. In recent years, because optical modulation methods are diversified, each optical modulator is often provided with two or more Mach-Zehnder interferometers. In those situations, by integrating the two or more Mach-Zehnder interferometers on one chip, it is possible to keep the size of the optical modulator small.

An optical modulator provided with two or more Mach-Zehnder interferometers is able to generate multi-level modulation signals by having a plurality of mutually-different electrical signals input thereto. In other words, by having the mutually-different electrical signals input from an external source to signal electrodes corresponding to the different Mach-Zehnder interferometers, the optical modulator is able to perform an optical modulation process that uses a multi-level modulation method such as a Differential Quadrature Phase Shift Keying (DQPSK) method.

In an electrical signal input section of an optical modulator, connectors corresponding to different electrodes may be provided individually; however, when one connector is provided for each of a plurality of electrical signals, the size of the optical modulator becomes large, and the mounting area increases. To cope with this situation, examples of methods for keeping the apparatus compact includes configuring the electrical signal input section by using a Flexible Printed Circuits (FPC) unit that has flexibility.

Figure 12:
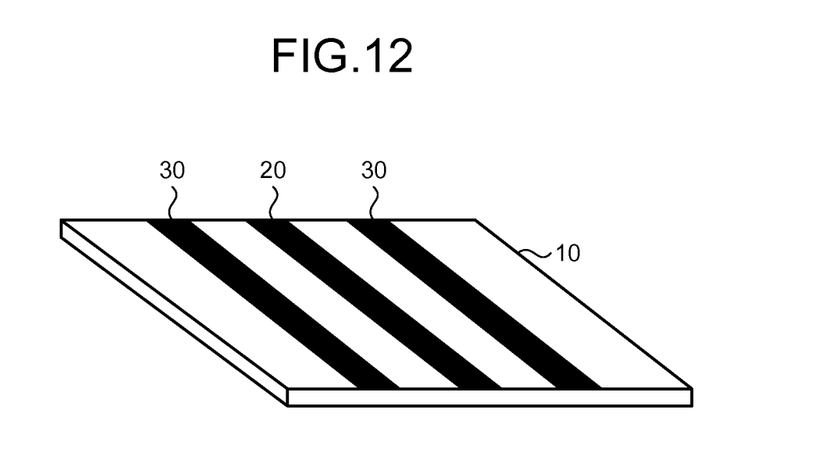
FIG. 12 is a drawing of specific exemplary wiring patterns formed on an FPC unit.

More specifically, the FPC unit has a plurality of wiring patterns corresponding to the plurality of signal electrodes of the optical modulator printed thereon, so that the electrical signals output from the driver are input to the optical modulator via the wiring patterns printed on the FPC unit. As for positional arrangements of the wiring patterns printed on the FPC unit, a coplanar path pattern is known, for example. When a coplanar path pattern is used, as illustrated in FIG. 12, for example, a signal-purpose wiring pattern 20 is printed on a surface of a substrate 10, and ground-purpose wiring patterns 30 are printed on either side of the signal-purpose wiring pattern 20. In other words, in correspondence with one signal electrode, the one signal-purpose wiring pattern 20 and the two ground-purpose wiring patterns 30 are printed on the FPC unit. Further, when the entirety of the FPC unit having the wiring patterns printed thereon is inserted into a connector provided for an optical modulator or a driver for example, the wiring patterns provided on the FPC unit are electrically connected to electrodes of the optical modulator or the driver.

Patent Document 1: Japanese Laid-open Patent Publication No. 2013-29791
Patent Document 2: Japanese Laid-open Patent Publication No. 2010-28800

However, connecting an FPC unit and a connector to each other presents a problem where it is difficult to achieve impedance matching by arranging the characteristic impedance of each of the wiring patterns formed on the FPC unit to be 50Ω. In other words, when the wiring patterns are printed by using a coplanar path pattern as described above, in order to arrange the characteristic impedance at the connection between the FPC unit and the connector to be 50Ω, the gap between the signal-purpose wiring pattern and the ground-purpose wiring pattern becomes as small as approximately tens of micrometers. For this reason, even by a very small variation during the manufacture of an FPC unit, for example, a short circuit may be caused among the wiring patterns when the FPC unit is inserted into a connector, or an impedance mismatch may be caused due to the characteristic impedance being other than 50Ω.

To cope with this situation, one possible idea that can be used for enlarging the gap between the signal-purpose wiring pattern and the ground-purpose wiring pattern is to use a grounded-coplanar-type path pattern. When the grounded-coplanar-type path pattern is used, a ground electrode is provided on the entirety of the rear surface on the back of a substrate on which the signal-purpose wiring pattern and the ground-purpose wiring patterns are formed. By using this configuration, it is possible to reduce the impact caused by the level of precision of the gap formed between the signal-purpose wiring pattern and the ground-purpose wiring pattern.

However, in order to arrange the characteristic impedance to be 50Ω while using the grounded-coplanar-type path pattern, the width of the signal-purpose wiring pattern becomes as small as approximately tens of micrometers. Consequently, a problem arises where, when the FPC unit is inserted into a connector, a contact failure may occur between the wiring patterns provided on the FPC unit and terminals provided inside the connector, or the signal-purpose wiring pattern may be detached from the substrate. Consequently, it is not realistic to use the grounded-coplanar-type path pattern at the part where the FPC unit is inserted into the connector.

As explained above, when the optical modulator and the driver are connected by using the FPC unit, it is difficult to achieve the impedance matching by arranging the characteristic impedance of each of the wiring patterns formed on the FPC unit to be 50Ω.

SUMMARY

According to an aspect of an embodiment, an optical module includes a driver that generates an electrical signal; an optical modulator that performs an optical modulation process by using the electrical signal generated by the driver; a connector that is electrically connected to either the driver or the optical modulator and is provided with an input/output terminal for the electrical signal; and a flexible substrate that has flexibility, is connected to the connector, and transfers the electrical signal generated by the driver to the optical modulator. In an end part connected to the connector, the flexible substrate has, on a first surface facing the input/output terminal, a signal-purpose wiring pattern used for transferring the electrical signal and a ground-purpose wiring pattern formed along the signal-purpose wiring pattern, and has, on a second surface that is different from the first surface, a ground electrode that partially covers the second surface and has a shorter electrical distance to the signal-purpose wiring pattern than an electrical distance between the signal-purpose wiring pattern and the ground-purpose wiring pattern.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The present disclosure is not limited to the exemplary embodiments.

[a] First Embodiment

Figure 1:
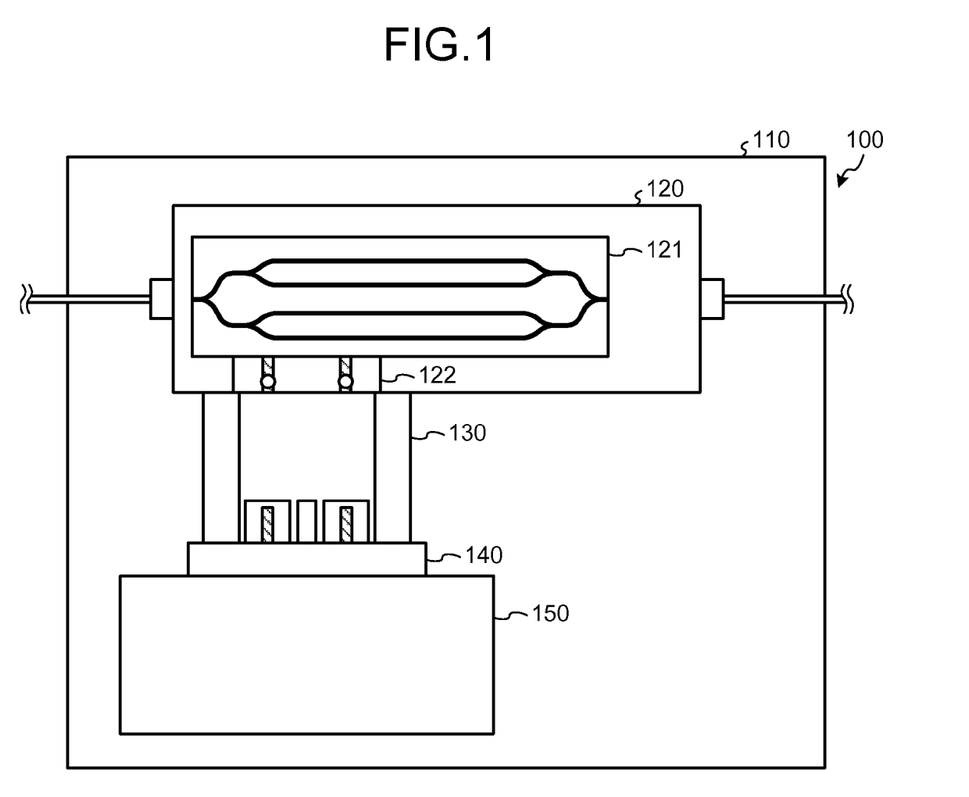
FIG. 1 is a schematic plan view of an optical module according to a first embodiment.

FIG. 1 is a schematic plan view of an optical module 100 according to a first embodiment. The optical module 100 illustrated in FIG. 1 includes a Printed Circuits Board (PCB) 110, an optical modulator 120, a Flexible Printed Circuits (FPC) unit 130, a connector 140, and a driver 150.

The PCB 110 is configured with, for example, a glass epoxy substrate and has various types of component parts that structure the optical module 100 mounted thereon.

The optical modulator 120 modulates light generated by a light source (not illustrated) and outputs the modulated light. At that time, the optical modulator 120 performs the optical modulation process on the basis of electrical signals output from the driver 150. More specifically, the optical modulator 120 includes a modulator chip 121 and a relay substrate 122.

The modulator chip 121 includes optical waveguides parallel to each other, signal electrodes, and ground electrodes and is configured to perform the optical modulation process on the basis of the electrical signals supplied to the signal electrodes, while transferring the light from the light source through the optical waveguides. More specifically, the optical waveguides are structured by, for example, forming a metal film of titanium (Ti) or the like on a part of a crystal substrate configured with electro-optic crystals of lithium niobate ($LiNbO_3$ (LN)) or lithium tantalite ($LiTaO_2$) and applying thermal diffusion thereto. Alternatively, the optical waveguides may be structured by performing a proton exchange process in benzoic acid after a patterning process. Further, the signal electrodes and the ground electrodes are coplanar electrodes that are formed along the parallel optical waveguides. In FIG. 1, because two sets of parallel optical waveguides are formed on the modulator chip 121, a signal electrode and a ground electrode are formed in correspondence with each of the sets of optical waveguides. The signal electrodes and the ground electrodes are, for example, formed on each of the optical waveguides through a patterning process. Further, to prevent the light transferred through the optical waveguides from being absorbed by the signal electrodes and the ground electrodes, a buffer layer is provided between the crystal substrate and the signal and ground electrodes. As for the buffer layer, for example, silicon dioxide ($SiO_2$) or the like formed with a thickness of approximately 0.2 to 2 μm may be used.

The relay substrate 122 relays the electrical signals output from the driver 150 to the modulator chip 121, so as to input the electrical signals to the signal electrodes of the modulator chip 121. In FIG. 1, the relay substrate 122 has two wiring patterns corresponding to the two signal electrodes formed on the modulator chip 121. To input the electrical signals to the plurality of signal electrodes formed on the modulator chip 121, when all the electrical signal input sections are arranged in a row on one side of the optical modulator 120, it is possible to facilitate the mounting process and to keep the mounting area small. For this reason, in the first embodiment, the optical modulator 120 is provided with the relay substrate 122, so that the electrical signals that are input from the one side of the optical modulator 120 are relayed to the modulator chip 121 by the relay substrate 122.

The FPC unit 130 is a flexible substrate having flexibility and is configured to supply the electrical signals output from the driver 150 to the optical modulator 120. In other words, one end of the FPC unit 130 is electrically connected to the relay substrate 122 provided for the optical modulator 120. The other end of the FPC unit 130 is connected to the driver 150 via the connector 140. As illustrated in FIG. 1, wiring patterns are printed on the surface of the FPC unit 130 positioned away from the PCB 110. Further, in the part connected to the connector 140, a coplanar path pattern is formed by wiring patterns for signals (hereinafter, "signal patterns") indicated with hatching in FIG. 1 and wiring patterns for the ground (hereinafter, "ground patterns") indicated with no hatching in FIG. 1. In other words, the ground patterns are printed on either side of each of the signal patterns.

The connector 140 is provided for the driver 150, so that the end of the FPC unit 130 can be inserted therein and removed therefrom. The connector 140 has, on the inside thereof, a plurality of terminals corresponding to the wiring patterns of the FPC unit 130. The FPC unit 130 and the driver 150 are electrically connected to each other as a result of each of the wiring patterns of the FPC unit 130 being in contact with the corresponding one of the terminals. Accordingly, the positional arrangements of the wiring patterns formed on the FPC unit 130 are determined in accordance with the positional arrangements of the terminals on the inside of the connector 140. The positional arrangements of the terminals and the pitch between the terminals in the connector 140 are regulated by a predetermined standard or the like.

The driver 150 generates the electrical signals used for modulating the light from the light source. In other words, the driver 150 generates the electrical signals having a high frequency of which the amplitude and the phase are in accordance with transmission data. The driver 150 drives the optical modulator 120 by using the electrical signals.

Figure 2:
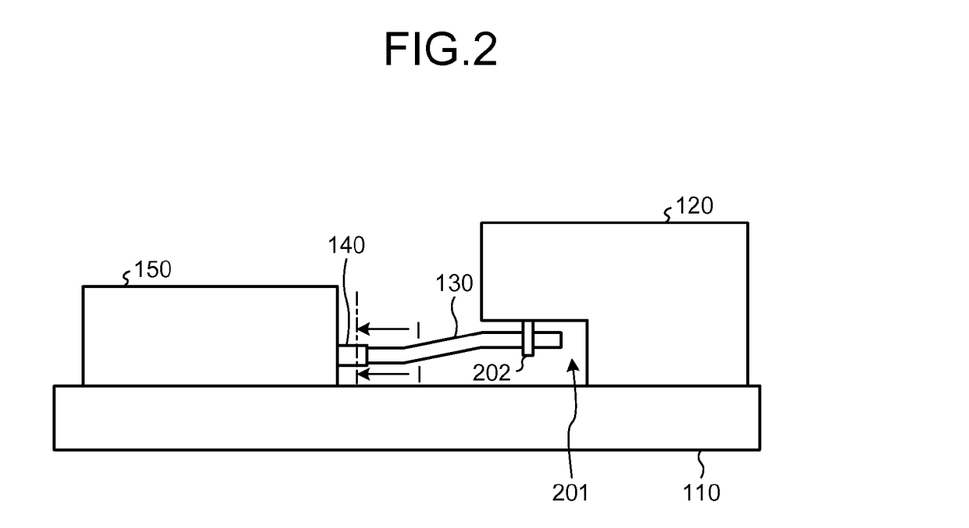
FIG. 2 is a schematic lateral view of the optical module according to the first embodiment.

Next, the electrical connections between the optical modulator 120, the FPC unit 130, and the driver 150 will be explained, with reference to FIG. 2. FIG. 2 is a schematic lateral view of the optical module 100 according to the first embodiment.

As illustrated in FIG. 2, the optical modulator 120 has a recessed section 201 formed in the vicinity of the PCB 110. The one end of the FPC unit 130 is inserted into the recessed section 201 formed in the optical modulator 120 and is connected to the optical modulator 120 on the inside of the recessed section 201. In other words, the FPC unit 130 and the optical modulator 120 are electrically connected to each other, by soldering a coaxial terminal 202 protruding downward from the ceiling face of the recessed section 201 together with the wiring patterns of the FPC unit 130.

Further, the end of the FPC unit 130 positioned on the driver 150 side is inserted into an insertion opening formed in the connector 140 and fixed thereto. Further, the FPC unit 130 and the driver 150 are electrically connected to each other as a result of the wiring patterns of the FPC unit 130 being in contact with the terminals of the connector 140, on the inside of the connector 140. The plurality of terminals of the connector 140 are arranged in a row on the ceiling face side, for example, of the insertion opening into which the end of the FPC unit 130 is inserted. Thus, on the end of the FPC unit 130 inserted into the insertion opening, the wiring patterns are printed on the surface positioned away from the PCB 110. However, in any other areas besides the end inserted into the insertion opening of the connector 140, the wiring patterns may be printed on either surface of the FPC unit 130. The wiring patterns printed on both surfaces are connected to each other via a through hole, for example.

Figure 3:
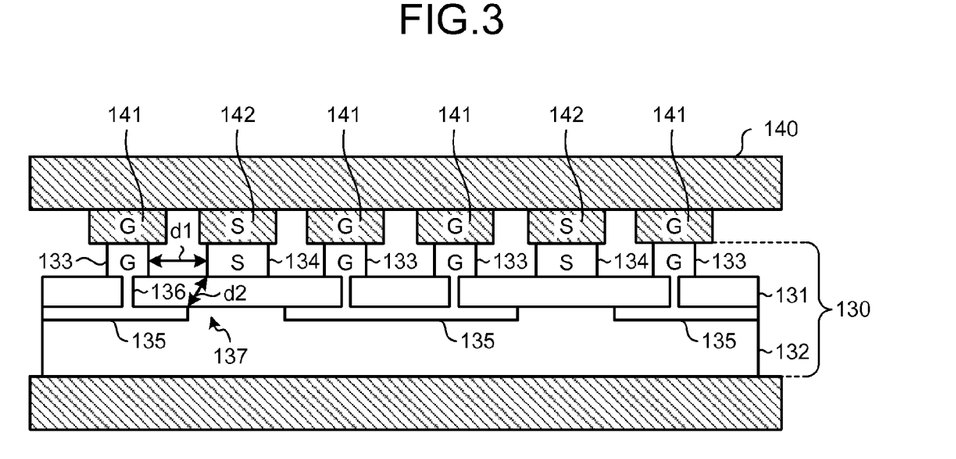
FIG. 3 is a schematic cross-sectional view illustrating a structure of a Flexible Printed Circuits (FPC) unit according to the first embodiment.

Next, a connection part between the FPC unit 130 and the connector 140 will be explained in detail, with reference to FIG. 3. FIG. 3 is a schematic cross-sectional view illustrating a structure of the FPC unit 130 according to the first embodiment. FIG. 3 illustrates a cross section of the FPC unit 130 at the line I-I in FIG. 2.

As illustrated in FIG. 3, on the ceiling face of the connector 140, ground-purpose terminals 141 and signal-purpose terminals 142 are arranged in a row. In other words, the ground-purpose terminals 141 are provided on either side of each of the two signal-purpose terminals 142. The positional arrangements of the terminals and the pitch between the terminals in the connector 140 are regulated by, for example, a predetermined standard or the like.

Further, the FPC unit 130 is structured by, for example, pasting a reinforcing plate 132 onto an FPC core 131 configured by using polyimide resin. Because both the FPC core 131 and the reinforcing plate 132 have flexibility, it is possible to bend and change the shape of the FPC unit 130. Further, the thickness of the FPC core 131 is in the range of approximately 25 to 50 µm. By adjusting the thickness of the reinforcing plate 132, it is possible to achieve a desired level of strength.

Further, on the front surface of the FPC core 131 facing the terminals of the connector 140, the wiring patterns corresponding to the terminals are printed. More specifically, ground patterns 133 are printed in the positions corresponding to the ground-purpose terminals 141, whereas signal patterns 134 are printed in the positions corresponding to the signal-purpose terminals 142. In this situation, the signal patterns 134 have a width of approximately hundreds of micrometers, for example, and have a sufficient level of strength so that no pattern breakage or detachment occurs even when the FPC unit 130 is inserted into and removed from the connector 140. Further, because the signal patterns 134 have a width of approximately hundreds of micrometers, no contact failure will occur with the terminals 142 of the connector 140, either.

Further, each of the ground patterns 133 is printed so that a gap d1 of, for example, approximately one or more hundreds of micrometers is formed between the ground pattern 133 and the corresponding signal pattern 134. The gap d1 is larger than the gap formed between a signal pattern and a ground pattern in a commonly-used coplanar path pattern for the purpose of arranging the characteristic impedance to be 50Ω. Thus, because the sufficiently large gaps are provided between the signal patterns 134 and the ground patterns 133, it is possible to prevent short circuits from occurring between the wiring patterns. It is noted that, however, because the gap d1 between the signal patterns 134 and the ground patterns 133 is relatively large, the characteristic impedance at the connection part would exceed 50Ω, if no adjustment was made. For this reason, in the first embodiment, ground electrodes 135 are provided on the rear surface of the FPC core 131, the rear surface being pasted onto the reinforcing plate 132.

The ground electrodes 135 are connected, via through holes 136, to the ground patterns 133 provided on the front surface of the FPC core 131. Further, the ground electrodes 135 are not provided throughout the entire rear surface of the FPC core 131, but are arranged so as to be spaced apart by slots 137 each having a larger width than the width of each of the signal patterns 134. In other words, the ground electrodes 135 are arranged so as to be spaced apart by the slots 137 in the width direction, on a part of the rear surface of the FPC core 131.

The slots 137 are formed on the rear surface in the positions where the signal patterns 134 are printed and each have a width that is larger than the width of each of the signal patterns 134. Further, the distance d2 between each of the signal patterns 134 and the corresponding ground electrode 135 is smaller than the gap d1 between the signal pattern 134 and the corresponding ground pattern 133. In other words, each of the ground electrodes 135 provided on the rear surface of the FPC core 131 is positioned closer to the corresponding signal pattern 134 than the corresponding ground pattern 133 is.

The gap d1 and the distance d2 in this situation are each expressed by an electrical distance, and not by a spatial Euclidean distance. Accordingly, the distance d2 is dependent on, for example, the dielectric constant of the FPC core 131, and the like. Further, even if any of the ground patterns 133 is positioned closer, in terms of the dimensions, to the corresponding signal pattern 134 than the corresponding ground electrode 135 is, it is sufficient if the ground electrode 135 is positioned closer, in terms of the electrical distance, to the signal pattern 134 than the ground pattern 133 is.

In the first embodiment, the characteristic impedance at the connection part between the FPC unit 130 and the connector 140 is set to 50Ω, by adjusting the electrical distance d2 between each of the signal patterns 134 and the corresponding ground electrode 135. In other words, if the ground electrodes 135 were not provided, the characteristic impedance at the connection part would exceed 50Ω. However, by providing the ground electrodes 135 and arranging the distance d2 from each of the ground electrodes 135 to the corresponding signal patterns 134 to be shorter than the value of the gap d1, the characteristic impedance is lowered. While making use of this phenomenon, the distance d2 is determined so as to achieve the impedance matching by arranging the characteristic impedance to be 50Ω. The ground electrodes 135 are thus arranged in the positions satisfying the distance d2. Consequently, even if the widths and the gaps of the wiring patterns printed on the front surface of the FPC core 131 are determined from the viewpoint of strengths or the contact with the terminals of the connector 140, it is possible to achieve the impedance matching by arranging the ground electrodes 135 in the partial areas on the rear surface of the FPC core 131.

As explained above, according to the first embodiment, the ground electrodes are arranged so as to be spaced apart by the slots on the rear surface of the FPC core having the signal patterns and the ground patterns printed on the front surface thereof. The distance between each of the signal patterns and the corresponding ground electrode is shorter than the gap between the signal pattern and the corresponding ground pattern. Consequently, even if the widths and the gaps of the signal patterns and the ground patterns are determined on the basis of elements other than the characteristic impedance, it is possible to arrange the characteristic impedance to be 50Ω, by adjusting the distance between each of the signal patterns and the corresponding one of the ground electrodes provided on the rear surface of the FPC core. In other words, for example, even if the size of the wiring patterns formed on the FPC unit is determined from the viewpoint of easiness of the mounting process or strengths, it is possible to achieve the impedance matching at the connection part between the FPC unit and the connector.

[b] Second Embodiment

A characteristic of a second embodiment lies in that impedance matching is achieved by providing oblong ground electrodes on the rear surface of the FPC core in such positions where the signal patterns are printed.

Figure 4:
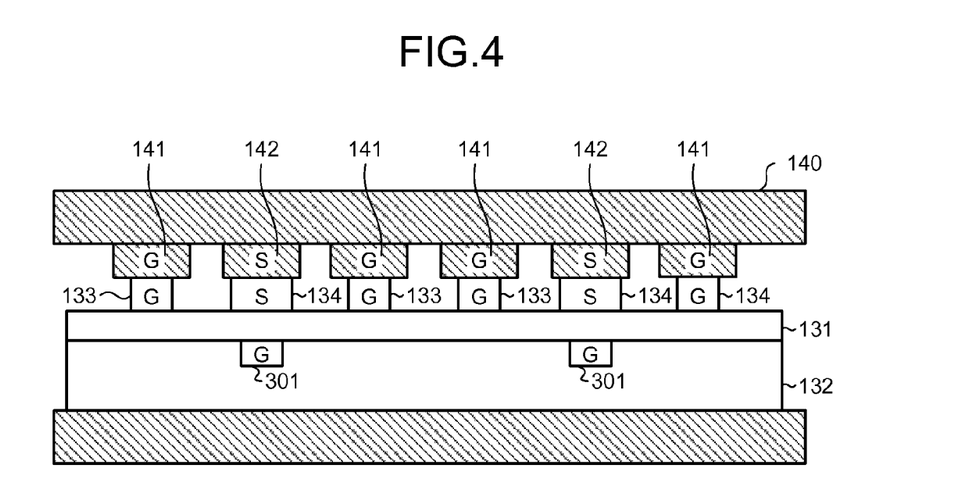
FIG. 4 is a schematic cross-sectional view illustrating a structure of an FPC unit according to a second embodiment.

Because the configuration of an optical module according to the second embodiment is the same as that in the first embodiment, the explanation thereof will be omitted. In the second embodiment, the structure of the FPC unit 130 is different from that in the first embodiment. FIG. 4 is a schematic cross-sectional view illustrating the structure of the FPC unit 130 according to the second embodiment. FIG. 4 illustrates a cross section of the FPC unit 130 at the line I-I in FIG. 2. In FIG. 4, some of the elements that are the same as those in FIG. 3 are referred to by using the same reference characters, and the explanation thereof will be omitted.

As illustrated in FIG. 4, on the front surface of the FPC core 131 facing the terminals of the connector 140, the wiring patterns corresponding to the terminals are printed. Further, ground electrodes 301 are provided on the rear surface of the FPC core 131, the rear surface being pasted onto the reinforcing plate 132.

In such a part that is not inserted into the connector 140, the ground electrodes 301 are connected, via through holes, to the ground patterns 133 formed on the front surface of the FPC core 131. Further, the ground electrodes 301 are not provided throughout the entire rear surface of the FPC core 131, but are provided only in such parts that correspond to the positions where the signal patterns 134 are printed. In other words, the ground electrodes 301 each have an oblong shape and are arranged in partial areas, in terms of the width direction, of the rear surface of the FPC core 131. Because the ground electrodes 301 are interposed between the FPC core 131 and the reinforcing plate 132, even if the end of the FPC unit 130 is inserted into and removed from the connector 140, the ground electrodes 301 will not be detached.

Further, similarly to the first embodiment, each of the ground electrodes 301 is positioned closer to the corresponding signal pattern 134 than the corresponding ground pattern 133 is, in terms of the electrical distances thereof. In other words, the ground electrode that is positioned closest to each of the signal patterns 134 is not one of the ground patterns 133, but is one of the ground electrodes 301. Consequently, it is the ground electrodes 301 that are able to dominantly increase and decrease the impedance of the signal patterns 134.

In the second embodiment, the characteristic impedance at the connection part between the FPC unit 130 and the connector 140 is set to 50Ω, by adjusting the width of each of the ground electrodes 301. In other words, if the ground electrodes 301 were not provided, the characteristic impedance at the connection part would exceed 50Ω. However, by providing the ground electrodes 301 and narrowing the width thereof, the characteristic impedance is lowered. While making use of this phenomenon, the width of each of the ground electrodes 301 is determined so as to achieve the impedance matching by arranging the characteristic impedance to be 50Ω. Consequently, even if the widths and the gaps of the wiring patterns printed on the front surface of the FPC core 131 are determined from the viewpoint of strengths or the contact with the terminals of the connector 140, it is possible to achieve the impedance matching by arranging the ground electrodes 301 in the partial areas on the rear surface of the FPC core 131.

As explained above, according to the second embodiment, the ground electrodes are arranged in the partial areas on the rear surface of the FPC core having the signal patterns and the ground patterns printed on the front surface thereof. The distance between each of the signal patterns and the corresponding ground electrode is shorter than the gap between the signal pattern and the corresponding ground pattern. Consequently, even if the widths and the gaps of the signal patterns and the ground patterns are determined on the basis of elements other than the characteristic impedance, it is possible to arrange the characteristic impedance to be 50Ω, by adjusting the width of each of the ground electrodes provided on the rear surface of the FPC core. In other words, for example, even if the size of the wiring patterns formed on the FPC unit is determined from the viewpoint of easiness of the mounting process or strengths, it is possible to achieve the impedance matching at the connection part between the FPC unit and the connector.

Figure 5:
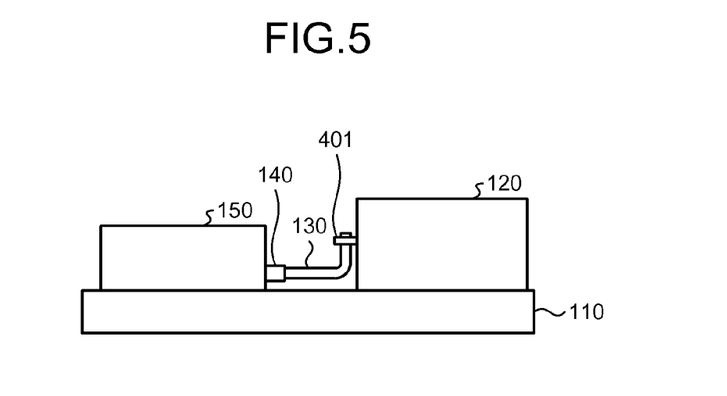
FIG. 5 is a drawing of a specific example of a connection between an optical modulator and a driver.

In the first and the second embodiments described above, it is assumed that the one end of the FPC unit 130 positioned on the optical modulator 120 side is connected to the coaxial terminal 202 by being inserted into the recessed section 201. However, the one end of the FPC unit 130 positioned on the optical modulator 120 side may be, for example, soldered onto a coaxial terminal 401 protruding from a lateral face of the optical modulator 120, as illustrated in FIG. 5. With this configuration, it is possible to connect the optical modulator 120 and the driver 150 to each other without unnecessarily prolonging the FPC unit 130 when, for example, the connector 140 is provided in a relatively high position of the driver 150.

Figure 6:
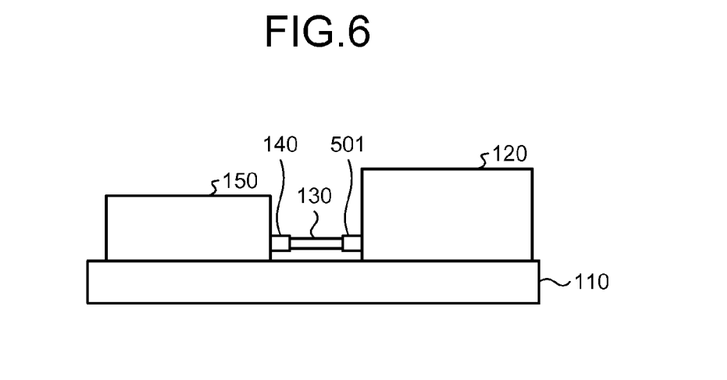
FIG. 6 is a drawing of another specific example of a connection between the optical modulator and the driver.

Further, the driver 150 does not necessarily have to be the only element with which a connector is provided. In other words, as illustrated in FIG. 6, the optical modulator 120 may also be provided with a connector 501, so that both ends of the FPC unit 130 are inserted into the connector 140 and the connector 501. With this configuration, it is possible to easily connect the optical modulator 120 and the driver 150 to each other and to improve work efficiency in the assembly of the optical module.

Figure 7:
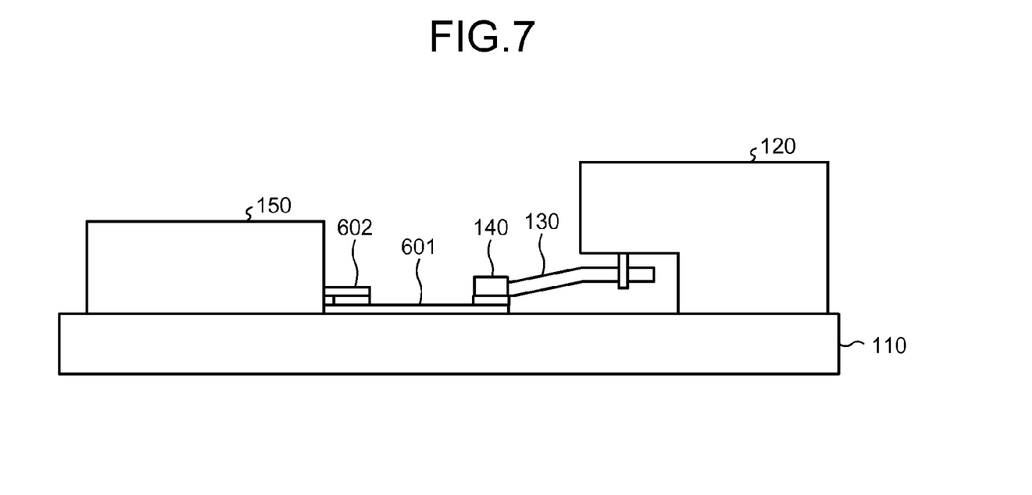
FIG. 7 is a drawing of yet another specific example of a connection between the optical modulator and the driver.

Further, when existing optical modulator 120 and driver 150 have no connectors provided therewith, it is also acceptable to solder the connector 140 onto the PCB 110. In other words, as illustrated in FIG. 7, the connector 140 may be soldered onto the PCB 110, so that the end of the FPC unit 130 can be inserted into the connector 140. Further, the connector 140 is connected to a lead pin 602 of the driver 150, via an electrode 601 provided on the PCB 110. With this configuration, it is possible to efficiently connect the component parts together by using the FPC unit, while making use of the existing component parts.

Figure 8:
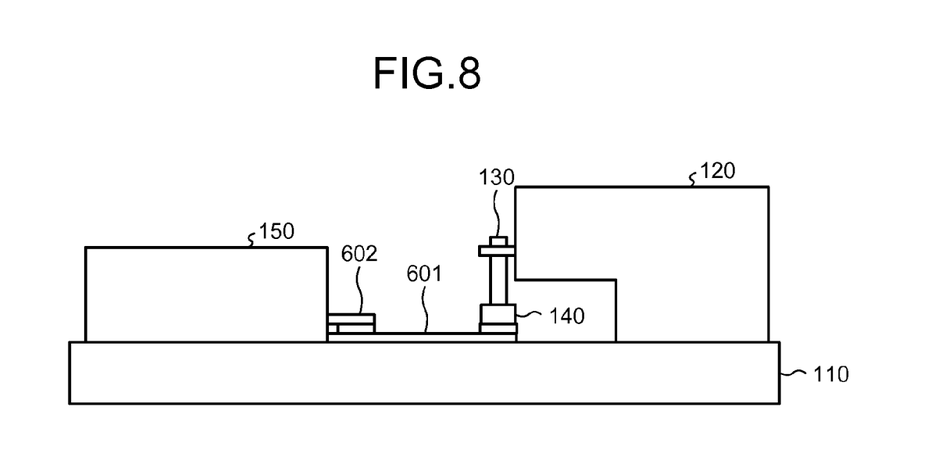
FIG. 8 is a drawing of yet another specific example of a connection between the optical modulator and the driver.

In the configuration illustrated in FIG. 7, the optical modulator 120 and the driver 150 have a relatively large space therebetween, which increases the mounting area for the component parts. To cope with this situation, as illustrated in FIG. 8, the insertion opening of the connector 140 may be directed upward, and a coaxial terminal may be arranged to protrude from the lateral face of the optical modulator 120. As a result, it is possible to connect the optical modulator 120 and the connector 140 to each other by arranging the FPC unit 130 to extend in the up-and-down direction. With this configuration, it is possible to reduce the mounting area for the component parts, compared to the configuration illustrated in FIG. 7.

Figure 9:
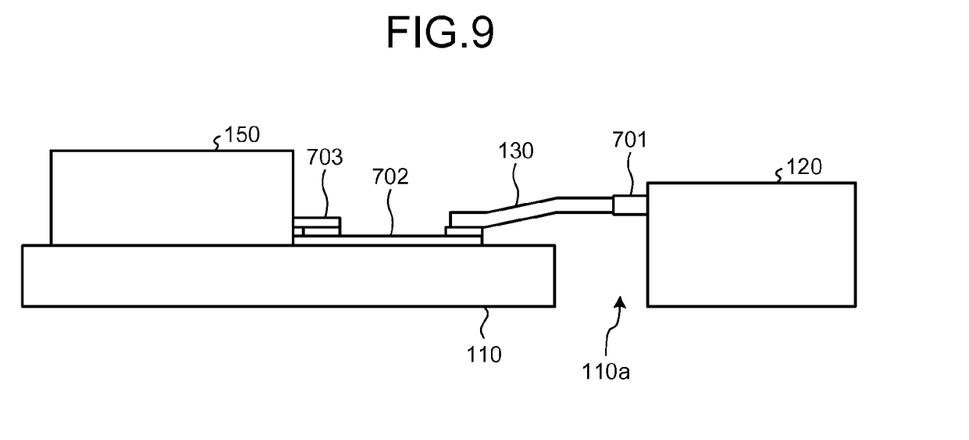
FIG. 9 is a drawing of yet another specific example of a connection between the optical modulator and the driver.

Further, for the purpose of keeping the height of the optical module short, for example, it is also acceptable to provide the PCB 110 with a sunken area, so that large-sized component parts can be arranged in the sunken area. In other words, as illustrated in FIG. 9, for example, it is acceptable to form a sunken area 110a in the PCB 110, so as to arrange the optical modulator 120 in the sunken area 110a. In that situation, by providing a connector 701 in a relative high position of the optical modulator 120, it is possible to arrange the one end of the FPC unit 130 positioned on the optical modulator 120 side to be inserted into the connector 701. Further, the other end of the FPC unit 130 positioned on the driver 150 side may be soldered onto an electrode 702 provided on the PCB 110. A lead pin 703 of the driver 150 is also soldered onto the electrode 702. With this configuration, it is possible to keep the height of the optical module short.

Figure 10:
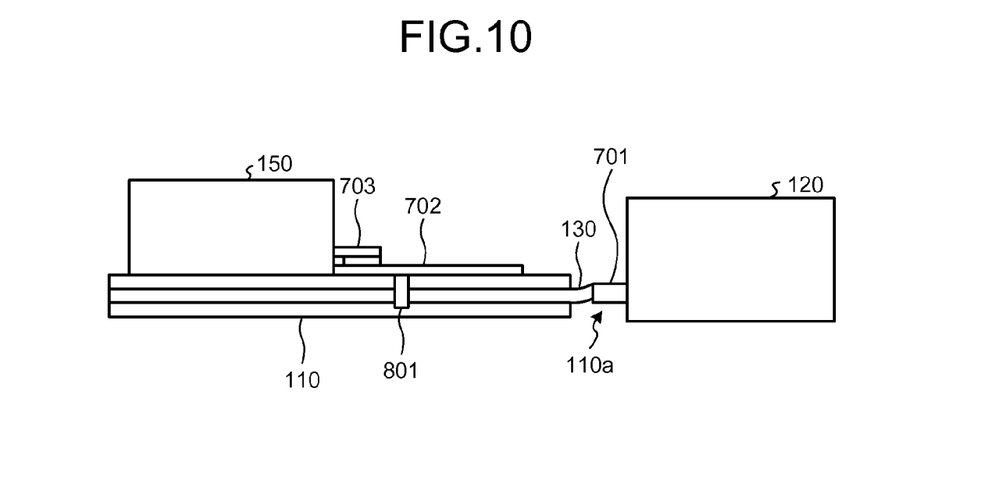
FIG. 10 is a drawing of yet another specific example of a connection between the optical modulator and the driver.

Further, when the PCB 110 is a multi-layer substrate, another arrangement is acceptable in which the FPC unit 130 is interposed between layers of the PCB 110, as illustrated in FIG. 10, for example. In that situation, the wiring patterns formed on the FPC unit 130 are connected, via a through hole 801, to the electrode 702 provided on the front surface of the PCB 110. This configuration allows the optical module to be designed with freedom.

Figure 11:
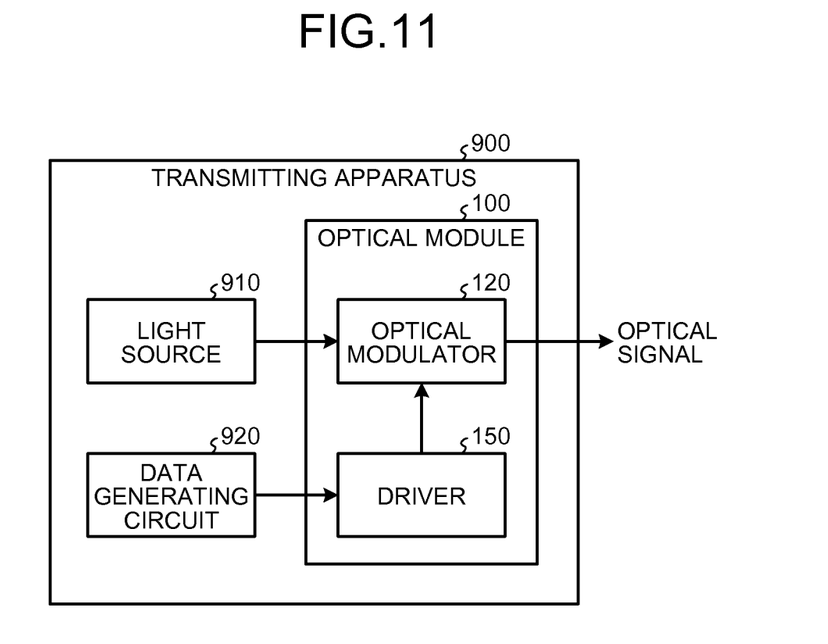
FIG. 11 is a block diagram of a specific exemplary configuration of a transmitting apparatus.

The optical module 100 explained in the embodiments above may be, for example, provided in a transmitting apparatus configured to transmit optical signals. FIG. 11 is a block diagram of a specific exemplary configuration of such a transmitting apparatus 900. As illustrated in FIG. 9, the transmitting apparatus 900 includes the optical module 100, a light source 910, and a data generating circuit 920.

The light source 910 includes, for example, a laser diode (LD) or the like and is configured to generate light. Further, the light generated by the light source 910 is input to the optical modulator 120 included in the optical module 100.

The data generating circuit 920 generates transmission data. The transmission data is input to the driver 150 included in the optical module 100, so that the driver 150 generates electrical signals having a waveform corresponding to the transmission data. Further, the electrical signals are supplied from the driver 150 to the optical modulator 120, so that an optical modulation process based on the electrical signals is performed. Further, the optical signals obtained as a result of the optical modulation process performed by the optical modulator 120 are transmitted through, for example, an optical fiber.

In this situation, as explained in the embodiments above, the optical modulator 120 and the driver 150 are connected to each other by the FPC unit 130. Impedance matching is achieved at the connection part between the FPC unit 130 and the connector 140. Consequently, the waveform of the electrical signals supplied from the driver 150 to the optical modulator 120 is prevented from being degraded, and the transmitting apparatus 900 is thus able to transmit the transmission data with a high level of precision.

According to at least one aspect of the optical module and the transmitting apparatus disclosed herein, an advantageous effect is realized where it is possible to achieve the impedance matching at the connection part between the flexible substrate and the connector.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An optical module comprising:
a driver that generates an electrical signal;
an optical modulator that performs an optical modulation process by using the electrical signal generated by the driver;
a connector that is electrically connected to either the driver or the optical modulator and is provided with an input/output terminal for the electrical signal; and
a flexible substrate that has flexibility, is connected to the connector, and transfers the electrical signal generated by the driver to the optical modulator, wherein
in an end part connected to the connector, the flexible substrate has, on a first surface facing the input/output terminal, a signal-purpose wiring pattern used for transferring the electrical signal and a ground-purpose wiring pattern formed along the signal-purpose wiring pattern, and has, on a second surface that is different from the first surface, a ground electrode that partially covers the second surface and has a shorter electrical distance to the signal-purpose wiring pattern than an electrical distance between the signal-purpose wiring pattern and the ground-purpose wiring pattern.

2. The optical module according to claim 1, wherein the flexible substrate has a plurality of ground electrodes arranged so as to be spaced apart by slots provided in positions corresponding to the signal-purpose wiring pattern formed on the second surface.

3. The optical module according to claim 2, wherein the flexible substrate has the plurality of ground electrodes arranged so as to be spaced apart by the slots each having a width larger than a width of the signal-purpose wiring pattern.

4. The optical module according to claim 1, wherein the flexible substrate has the ground electrode arranged in a position corresponding to the signal-purpose wiring pattern formed on the second surface.

5. The optical module according to claim 1, wherein the flexible substrate further has a through hole used for connecting the ground-purpose wiring pattern and the ground electrode to each other.

6. The optical module according to claim 1, wherein the flexible substrate further has a reinforcing plate pasted onto the second surface in such a manner that the ground electrode is interposed between the second surface and the reinforcing plate.

7. The optical module according to claim 1, wherein the connector is fixed to a substrate and is electrically connected to the driver via an electrode provided on the substrate.

8. The optical module according to claim 1, wherein the optical modulator is provided in a sunken area that is sunken to be lower than a surface of a substrate and is provided with the connector arranged in a position higher than the surface of the substrate.

9. The optical module according to claim 1, wherein
the optical modulator is provided in a sunken area that is sunken to be lower than a surface of a substrate and is provided with the connector arranged in a position lower than the surface of the substrate, and
the flexible substrate extends from the connector to an inside of the substrate.

10. A transmitting apparatus comprising:
a light source that generates light;
a driver that generates an electrical signal corresponding to transmission data;
an optical modulator that modulates the light generated by the light source, by using the electrical signal generated by the driver;
a connector that is electrically connected to either the driver or the optical modulator and is provided with an input/output terminal for the electrical signal; and
a flexible substrate that has flexibility, is connected to the connector, and transfers the electrical signal generated by the driver to the optical modulator, wherein
in an end part connected to the connector, the flexible substrate has, on a first surface facing the input/output terminal, a signal-purpose wiring pattern used for transferring the electrical signal and a ground-purpose wiring pattern formed along the signal-purpose wiring pattern, and has, on a second surface that is different from the first surface, a ground electrode that partially covers the second surface and has a shorter electrical distance to the signal-purpose wiring pattern than an electrical distance between the signal-purpose wiring pattern and the ground-purpose wiring pattern.

* * * * *